United States Patent [19]
Thorne

[11] 3,908,414
[45] Sept. 30, 1975

[54] BICYCLE LOCKING HARNESS
[76] Inventor: Stephen Lee Thorne, 2687 Las Aromas, Oakland, Calif. 94611
[22] Filed: Mar. 11, 1974
[21] Appl. No.: 449,867

Related U.S. Application Data
[63] Continuation of Ser. No. 312,536, Dec. 6, 1972, abandoned.

[52] U.S. Cl. .................................................. 70/18
[51] Int. Cl.² ........................................ E05B 73/00
[58] Field of Search .............. 70/14, 15, 18, 30, 49, 70/57–62, 225–227, 233–234

[56] References Cited
UNITED STATES PATENTS
3,766,757  10/1973  Storey .................................... 70/18

*Primary Examiner*—Robert L. Wolfe
*Attorney, Agent, or Firm*—Townsend and Townsend

[57] ABSTRACT

A bicycle locking harness comprising three elongate segments of hardened steel to define, when in locking position, a substantially triangular configuration with the base segment of the triangle encircling the front and rear wheel rims of a bicycle and with the sides of the triangle converging at their outer ends to encircle a primary anchor support. In one embodiment, the three segments are hingedly connected together to permit the harness to be foldably compacted for convenience of storage and carrying.

2 Claims, 5 Drawing Figures

U.S. Patent  Sept. 30,1975  3,908,414
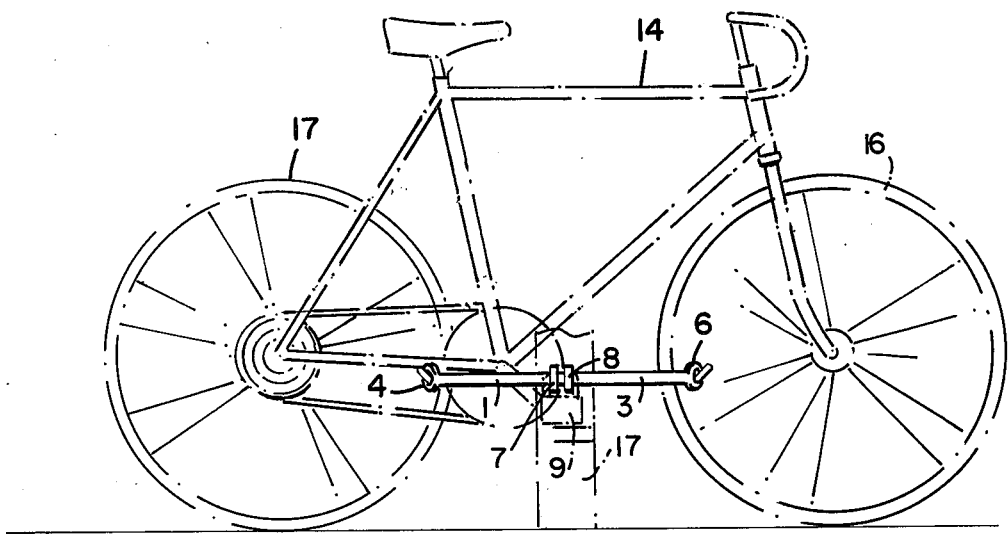
FIG_3
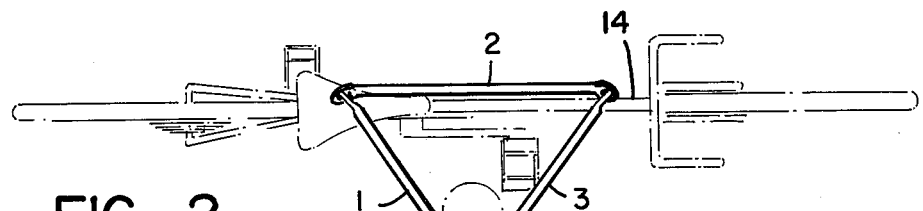
FIG_2
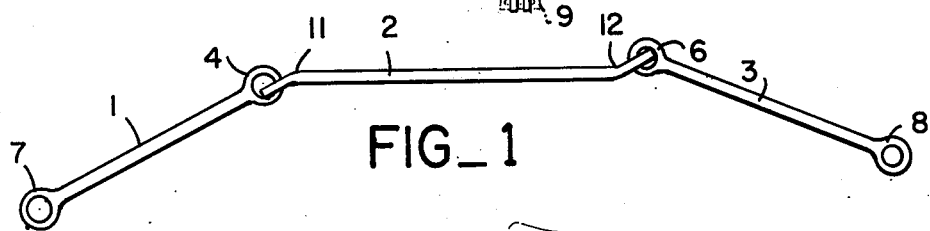
FIG_1
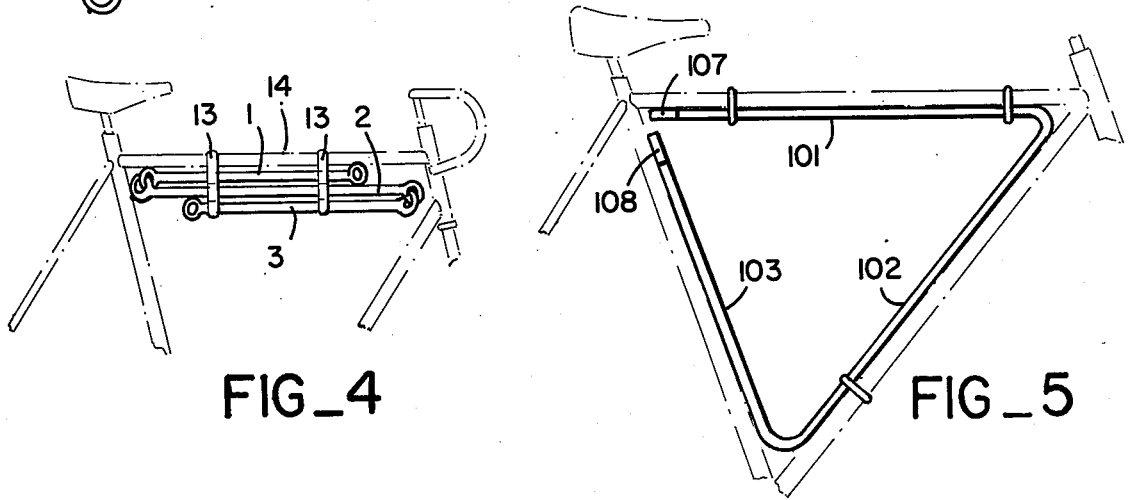
FIG_4
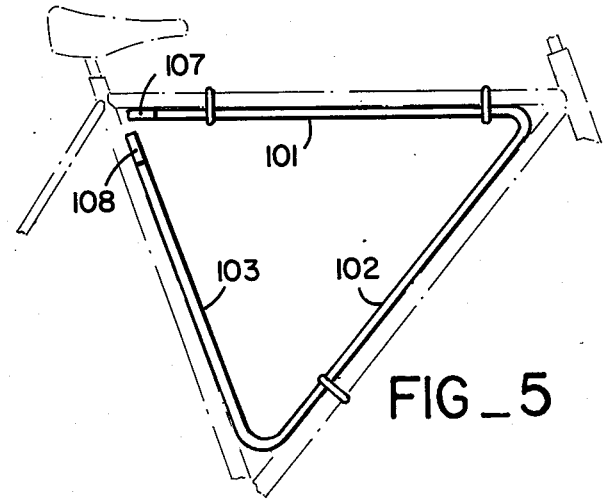
FIG_5

BICYCLE LOCKING HARNESS

This is a continuation of application Ser. No. 312,536, filed Dec. 6, 1972 and now abandoned.

This invention relates to a new and improved locking assembly or harness for securing bicycles or other similar vehicles against theft.

With the recent advent and popularity of the rather expensive ten-speed bicycle, the reported statistics emanating from various law enforcement agencies concerning the increase of bicycle thefts has greatly accelerated to the point of reaching alarming proportions.

Currently, the most usual and common practice for securing a bicycle to prevent its theft is through the use of a locking chain in conjunction with a combination or key actuated padlock. In the preferred practice today, a relatively heavy hardened steel linked chain of perhaps 5 feet in length is passed or threaded through the spokes of both the front and rear wheels of the bicycle and in such manner that the ends of the chain are wrapped around some stationary primary support such as a vertical post, small diameter tree, permanent building fixture, or some other fixed support anchored to the ground or a building or a heavy vehicle such as a truck or trailer.

The use of a chain lock is not generally satisfactory for several reasons. Except for very heavy chains formed with links of perhaps one-half-inch or greater diameter hardened steel, the chains can be quite readily severed by a thief using conventional bolt cutters. Even in instances where steel chains are made heavy enough to resist severing by use of bolt cutters, it is not uncommon practice for the thieves to utilize liquid nitrogen to freeze and thereby embrittle a metal link which, when subjected to a sharp shock such as delivered by a hammer blow, will cause the link to fracture and thereby separate.

A further disadvantage to a cyclist having to employ heavy locking chains follows as a result of the sheer weight of such a device. For example, a 5-foot steel chain with ½-to ⅝-inch thick links will weigh 8 to 10 pounds which represents extra dead weight that has to be carried on the bicycle when not in use. This is very undesirable from the standpoint of many cyclists whose expensive bicycles are purposely built of lightweight, high strength aluminum or magnesium alloys to maintain the weight of the bicycle at a minimum.

As will be more fully described in greater detail hereinafter, a locking harness constructed in accordance with the principles of the present invention is fabricated from essentially three elongate segments of hardened steel bar stock, which may preferably be of circular cross section. In one embodiment, the three segments are formed from an integral length of round bar stock into a substantially triangular configuration with the opposite ends of the stock formed with rings or eyelets positioned sufficiently close enough together to permit them to be padlocked together. In another embodiment, the three segments of bar stock are hingedly connected together so that the three segments can be manipulated to form a triangular configuration when in locking position and be folded into a relatively flat pack condition for convenience of storage and carrying on the bicycle when not in use. Other embodiments of the invention are possible, which will be mentioned later.

The present invention provides new, unexpected and material advantages over the more conventional chain locking systems. Firstly, I have found through experimentation that if the bar stock is made from approximately ½-inch diameter hardened steel (such as standard ASTM 8620 steel with Rockwell hardness of C 62–64 or Brinell 653 to 682) not only will it resist severing from conventional 30-inch bolt cutters, but I have found that it is not possible to sever the steel segments by freezing a localized area thereof with liquid nitrogen and subjecting it to a sharp shock such as is possible to do with a link chain of ½-inch hardened steel material. I am of the belief that the explanation for this latter phenomenon is that because each elongate segment of the steel harness consists of a relatively massive and homogeneous piece of metal, it functions as a heat sink or reservoir capable of transferring heat to a local zone where the liquid nitrogen is applied at a sufficiently accelerated rate to prevent the metal from freezing and being rendered brittle enough to fracture upon application of a sharp shock as hereinabove explained.

Another advantage of a locking harness embodying my invention over conventional heavy chain locks of the same lineal length (e.g., 5 feet) is that my harness is very materially lighter in weight. In this connection, it is apparent that a straight segment of steel of a given diameter, such as employed in my invention, will utilize a great deal less material and weigh a good deal less than a link chain made of the same material and in the same diameter stock. In the preferred embodiment of my invention, constructed of three hinged segments and utilizing ½-inch hardened steel with a total lineal length of approximately 5 feet, weight will be less than 3½ pounds compared to the 8 or 10 pounds a corresponding heavy link chain would weigh.

Other objects and advantages of the invention will become apparent upon reading the following specification and referring to the accompanying drawings in which similar characters of reference represent corresponding parts in each of the several views.

IN THE DRAWINGS:

FIG. 1 is a side elevational view of the preferred embodiment of the invention showing the three hinged segments in substantially extended position.

FIG. 2 is a top plan view showing the device of FIG. 1 encircling the front and rear wheel rims of a bicycle (shown in phantom lines) and a primary support and with ends of the locking harness padlocked together.

FIG. 3 is a vertical elevational view of the arrangement shown in FIG. 2.

FIG. 4 shows the embodiment of FIG. 1 in folded position and removably supported from the main horizontal bicycle frame (shown fragmentarily).

FIG. 5 shows another embodiment of the invention carried within the triangular open framework of a bicycle (shown fragmentarily).

Referring now more specifically to the drawings, FIG. 1 shows the preferred embodiment which comprises generally three elongate segments of hardened steel round bar stock and designated by the characters 1, 2 and 3 respectively. Segments 1 and 3 are hingedly connected to the ends of segment 2 by interlocking eyelets 4 and 6 respectively. The outer ends of segments 1 and 3 are likewise formed with eyelets with 7 and 8, which in locking position as shown in FIGS. 2 and 3 can be brought into close juxiposition and secured together with a conventional padlock 9. It is further observed that outer ends of segment 2 are angularly bent as at 11 and 12 to permit the three segments to be hingedly folded into a compact pack for convenience of storage and carrying such as depicted in FIG. 4. FIG. 4 shows fragmentarily a bicycle from which the foldedly compacted device is suspended from the horizontal bicycle frame 14 by means of simple clips or straps 13. It is apparent that special carrier clips or other devices can be made to support the compacted locking structure from either the main horizontal frame piece of the bicycle or from some other selected frame member. In the case of a girl's bicycle, which normally does not include a horizontal frame member connecting the seat post to the steering post as is conventional in men's bicycles, a device of the present type could be secured to the seat post or, if desired, stowed and carried on a conventional bicycle baggage rack (not shown) such as the type that is commonly supported over the rear wheel.

As shown in FIGS. 2 and 3 particularly, the locking harness of FIG. 1 is constructed in terms of size and shape to encircle the front and rear wheel rims 16 and 17 of the bicycle and a suitable primary anchor support such as a vertical post or small tree designated by the numeral 17. The middle segment 2 of the harness must be long enough to span the distance between the rearwardmost location of the front wheel rim and the forwardmost location of the rear wheel rim. Additionally, the maximum length any of the segments 1, 2 or 3 should be shorter than the length of the longest frame member of the bicycle which is to be utilized to support the harness in folded condition. Thus, as shown in FIG. 4, the maximum length of any of the segments 1, 2 or 3 should be somewhat less than the length of the main horizontal frame support 14 of the bicycle.

FIG. 5 discloses how the basic concepts of the present invention can be embodied in a simplified structure formed of an integral length of hardened steel round bar stock and formed by bending it into a triangular configuration defining three elongate segments indicated at 101, 102 and 103 respectively. The outer ends of segments 101 and 103 terminate in integral eyelets 107 and 108 which are spaced apart from one another a sufficient distance to permit either of the legs 107 or 108 to be threaded through and around the front and rear wheel rims so as to occupy a locking position substantially the same arrangement shown in FIGS. 2 and 3. In short, the embodiment of FIG. 5 when in locking position would locate segments 101, 102 and 103 in the same relative positions as segments 1, 2 and 3 of the earlier described embodiment of FIGS. 1, 2 and 3. Eyelets 107 and 108 are provided to accommodate a padlock such as has been identified in respect to numeral 9 of FIGS. 2 and 3. It will be appreciated that the metal bar stock from which the device of FIG. 5 is made has some resiliency springiness so as to permit the facing between the eyelets 107 and 108 to be spread further apart or closed together to facilitate threading of the harness through wheels to its locked position and to bring the eyelets close enough together to accommodate a conventional padlock.

FIG. 5 further shows that the dimensions of the segments are of a suitable length to permit the device to be conveniently accommodated and supported within the triangular framework of the bicycle.

Although both embodiments of the invention which have been specifically disclosed and described herein show a harness which in locked form assumes the configuration of a near isosceles triangle, it is understood that it is within the scope of the present invention to fabricate a locking harness in which the legs may be of substantial uneven length and without changing the basic function and purposes of the device. For example, if it is desired to make a locking harness that is adapted to encircle only one wheel rim and an adjacent frame member of the bicycle, the middle segment 2 of the embodiment of FIG. 1, for example, can be of a correspondingly shorter length.

It is also possible, if so desired, to hinge only one of the side legs to the middle or base leg to permit only the one hinged side to fold into parallelism with the base member. It is also possible to curve or bend to some extent each or all three segments to form a modified triangular harness configuration to suit particular needs or specifications as may be desired.

Finally, although the invention has been described in some detail, by way of illustration and example for purposes of clarity and understanding, it is understood that other changes, modifications and embodiments may be practiced within the spirit of the invention as limited only by the scope of the claims appended hereto. For example, while the invention has been shown and described in the context of a locking device for a bicycle, it will be readily apparent that the invention has utility with other similar types of vehicles such as motorcycles and the like.

I claim:

1. A device for locking a spoke-wheeled vehicle to a stationary support comprising three legs of hardened steel bar stock, two of said legs being joined to the third leg at opposite ends of the latter to form a substantially split triangle shaped device, the said third leg forming the base of the triangle and the other two legs forming the sides thereof with the split occurring between the outer adjacent ends of the latter, means for interlocking the outer ends of the side legs together to form a closed triangle locking mechanism, the base leg being of sufficient length to span the shortest distance between the spoked front and rear wheel rims of a vehicle, and the side legs being of sufficient length to project through the spoked front and rear wheels and embrace a stationary support, said substantially split triangle being formed from one continuous length of bar stock bent in two locations to form the triangular configuration.

2. A device according to claim 1 and wherein said split triangle device is shaped and constructed to be detachably mounted inside the triangular frame of a man's bicycle with all three legs confined substantially within the vertical plane of said bicycle frame, and wherein said means for interlocking the outer ends of the side legs together are disposed substantially vertically directly below the seat of the bicycle when the said triangular locking device is mounted within said bicycle frame.

* * * * *